United States Patent [19]

Viesturs et al.

[11] 4,193,543
[45] Mar. 18, 1980

[54] SOLAR HEATING SYSTEM

[76] Inventors: Eric A. Viesturs, 680-B Heritage Village; Gundar E. Viesturs, Oak Hill Dr., both of Southbury, Conn. 06488

[21] Appl. No.: 880,379

[22] Filed: Feb. 23, 1978

[51] Int. Cl.² ............................................. F24D 11/00
[52] U.S. Cl. ..................... 126/430; 126/437; 126/449; 126/400; 165/104 S
[58] Field of Search ....................... 126/270, 271, 400; 237/1 A; 165/104 S; 251/326, 205

[56] References Cited
U.S. PATENT DOCUMENTS

| | | | |
|---|---|---|---|
| 3,369,541 | 2/1968 | Thomason | 126/400 |
| 3,910,253 | 10/1975 | Thomason et al. | 126/271 |
| 3,939,818 | 2/1976 | Hamilton et al. | 126/271 |
| 3,943,911 | 3/1976 | Yu | 126/271 |
| 3,996,919 | 12/1976 | Hepp | 126/400 X |
| 4,015,586 | 4/1977 | Vroom et al. | 237/1 A |
| 4,048,981 | 9/1977 | Hobbs | 126/271 |
| 4,076,013 | 2/1978 | Bette | 126/400 X |
| 4,085,667 | 4/1978 | Christianson | 126/270 |
| 4,114,396 | 9/1978 | Rickert | 165/104 S X |

*Primary Examiner*—Lloyd L. King
*Assistant Examiner*—Henry Bennett

[57] ABSTRACT

A closed hollow waterproof chamber is disposed below the removable, sectional bottom floor of a building. The chamber is partially filled with water and contains air. The chamber is lined with plastic. A plastic sheet covers the water by resting upon the top surface thereof and is secured to the liner at the periphery in an air-tight manner preventing moisture from entering the building. A solar heat collecting unit is disposed on the roof of the building. The unit has an upper water inlet and a lower water outlet. Both the upper water inlet and the lower water outlet are extended horizontally on the top and the bottom of the solar heat-collecting unit. Water passing through the unit from inlet to outlet is heated by the sun. Water is pumped from the chamber to the inlet and released to flow downwardly to the outlet under the force of gravity and is drained from the outlet to the chamber whereby water in the chamber is heated. A flexible transparent plastic cover is detachably secured to the unit to protect same from external weather conditions. Air under pressure is introduced between the cover and the unit to inflate the cover.

5 Claims, 6 Drawing Figures

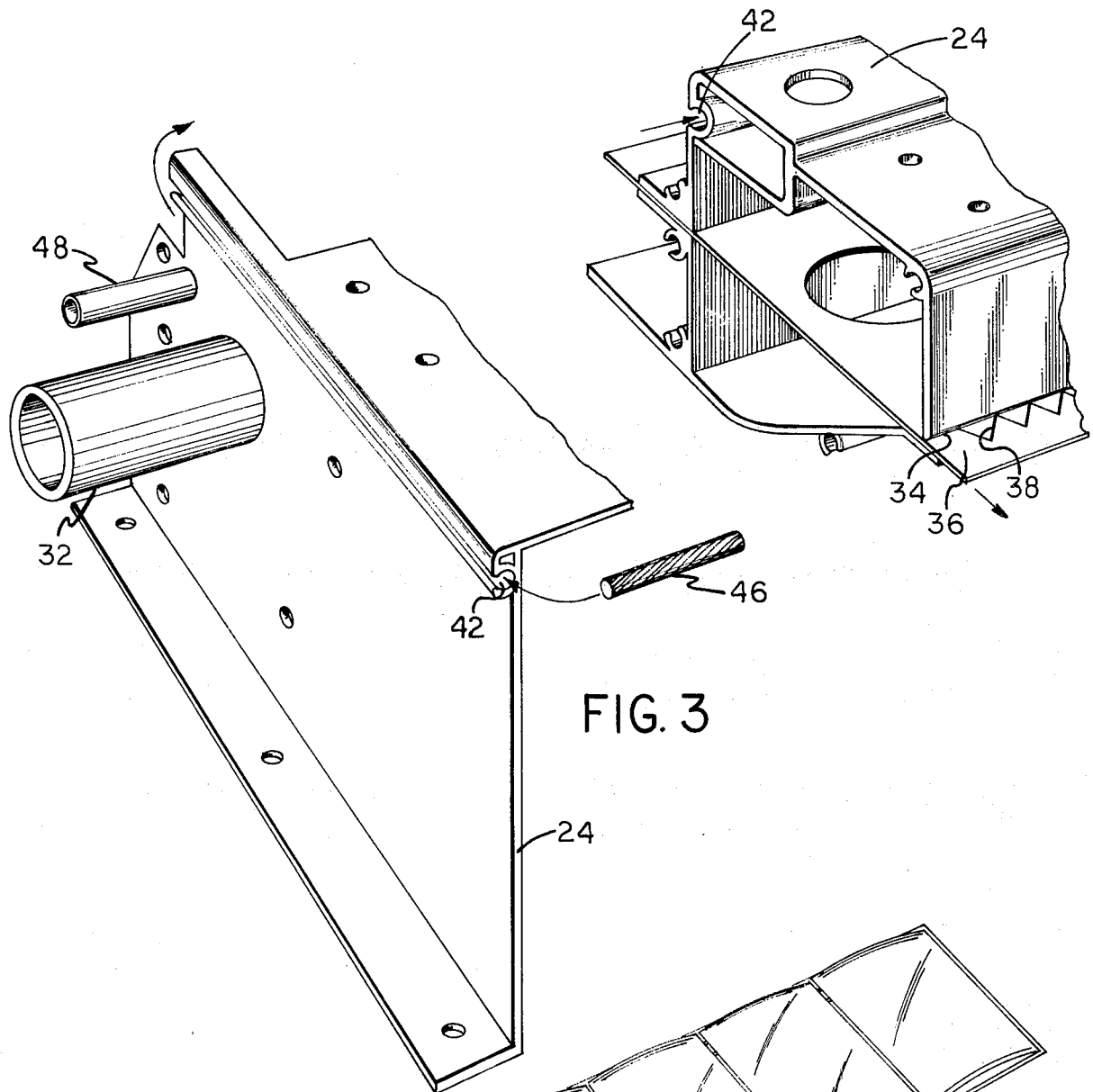
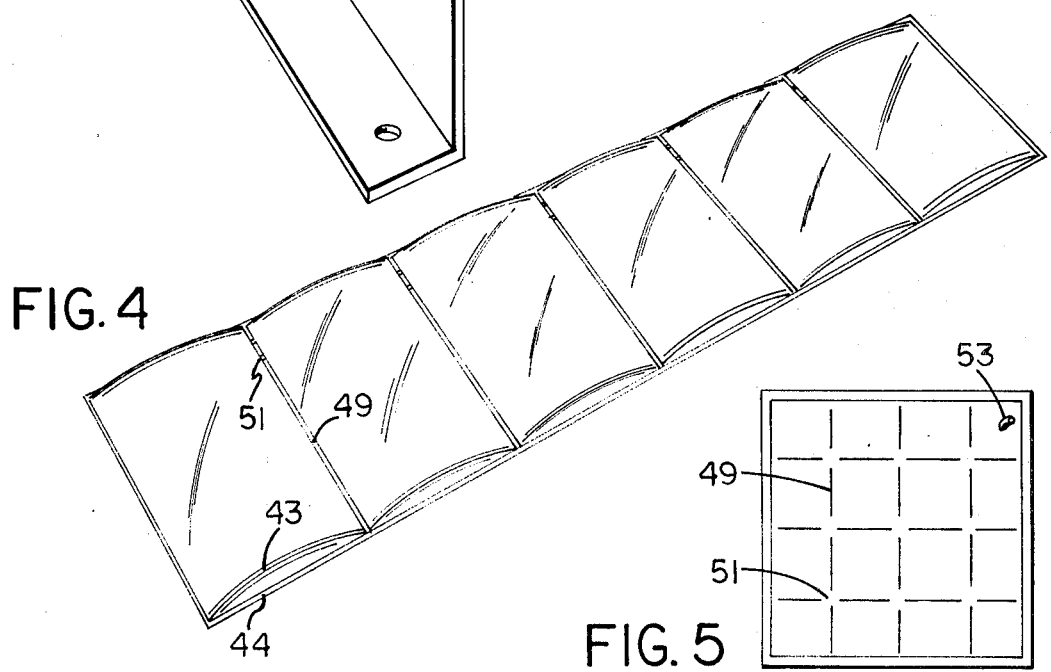

SOLAR HEATING SYSTEM

SUMMARY OF THE INVENTION

This invention is directed toward a new type of solar heating system wherein heat exchanger means transfers heat from a hot water source heated by solar energy to air which is then used to heat the interior of a building and wherein a roof mounted solar heat collecting unit is protected from external weather conditions by a pressurized, easily replacable, inexpensive, transparent flexible plastic cover.

To this end a closed waterproof hollow chamber partially filled with water and containing air is disposed below the bottom floor of a building. Plastic sheet is disposed at the interface of air and water, resting on the top surface of the water. Solar heat collecting means mounted on the roof of the building has an upper water receiving inlet and a lower water discharge outlet. Water flowing through the heat collecting means from inlet to outlet is heated by solar energy.

An easily replaceable, flexible transparent cover is secured to the collector unit to protect same from external weather conditions. The cover must be inflated to perform this function and air under pressure is introduced between the cover and the unit to inflate the cover as needed.

Water is pumped out of the chamber to the water inlet of the unit and is drained from the outlet of the unit back into the chamber whereby the water in the chamber is heated.

Heat exchanger means disposed in the chamber is in contact with the heated water. Air is forced under pressure into contact with the exchanger means and is heated thereby.

The heated air is fed through suitable spaced outlets in the building into the building interior and is circulated therein to heat the building interior. Thereafter the circulated air is returned to the chamber to continue the heating process.

BRIEF DESCRIPTION OF THE DRAWINGS

FIG. 3 is a detail view of a portion of the structure of the solar heat collecting unit.

FIG. 4 is a detail view of an alternate arrangement for a plastic cover.

FIG. 5 illustrates another modification of a plastic cover.

DETAILED DESCRIPTION OF PREFERRED EMBODIMENTS

Figure 1:
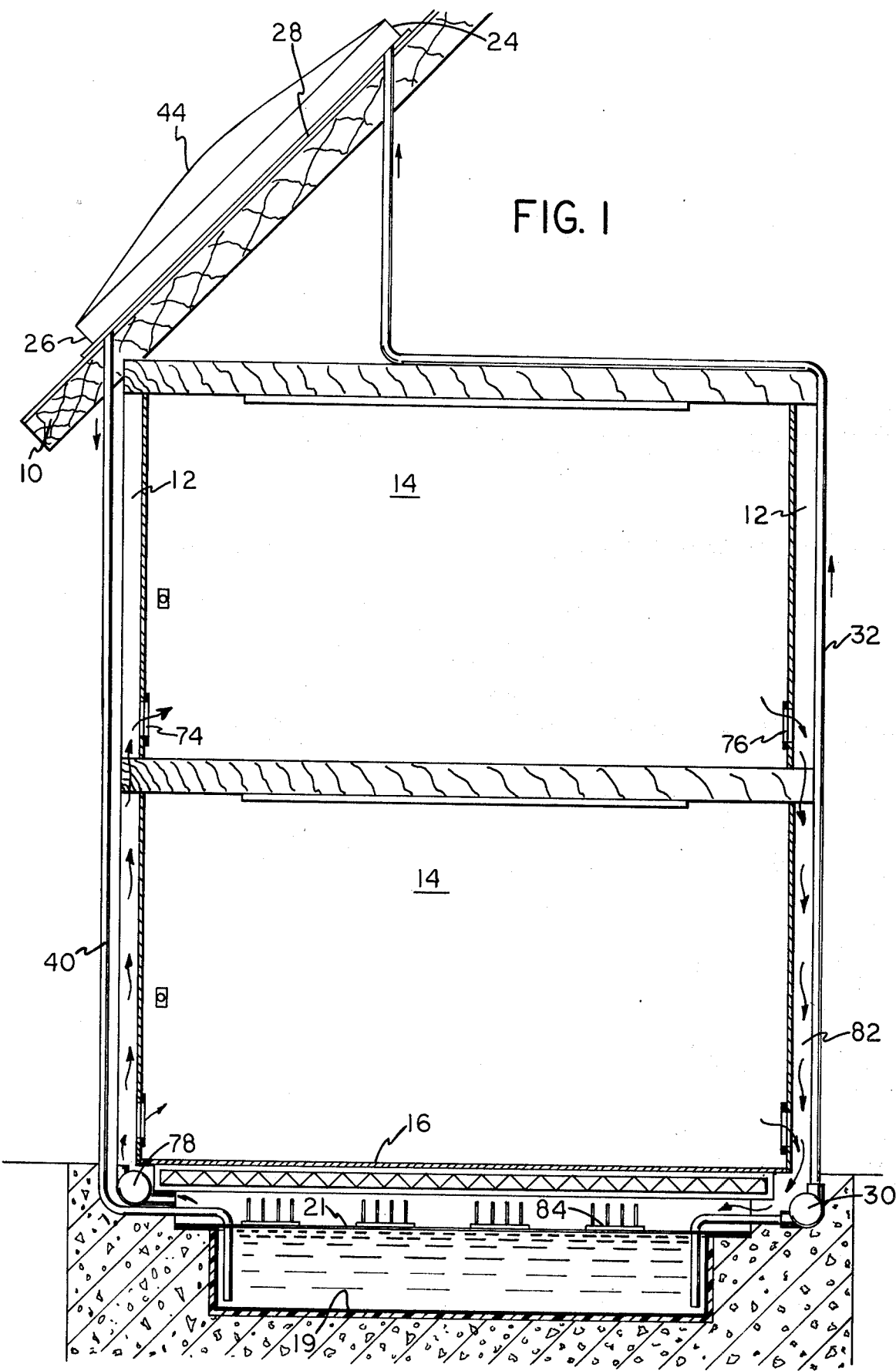
FIG. 1 is a vertical cross sectional view of one embodiment of the invention.
Figure 2:
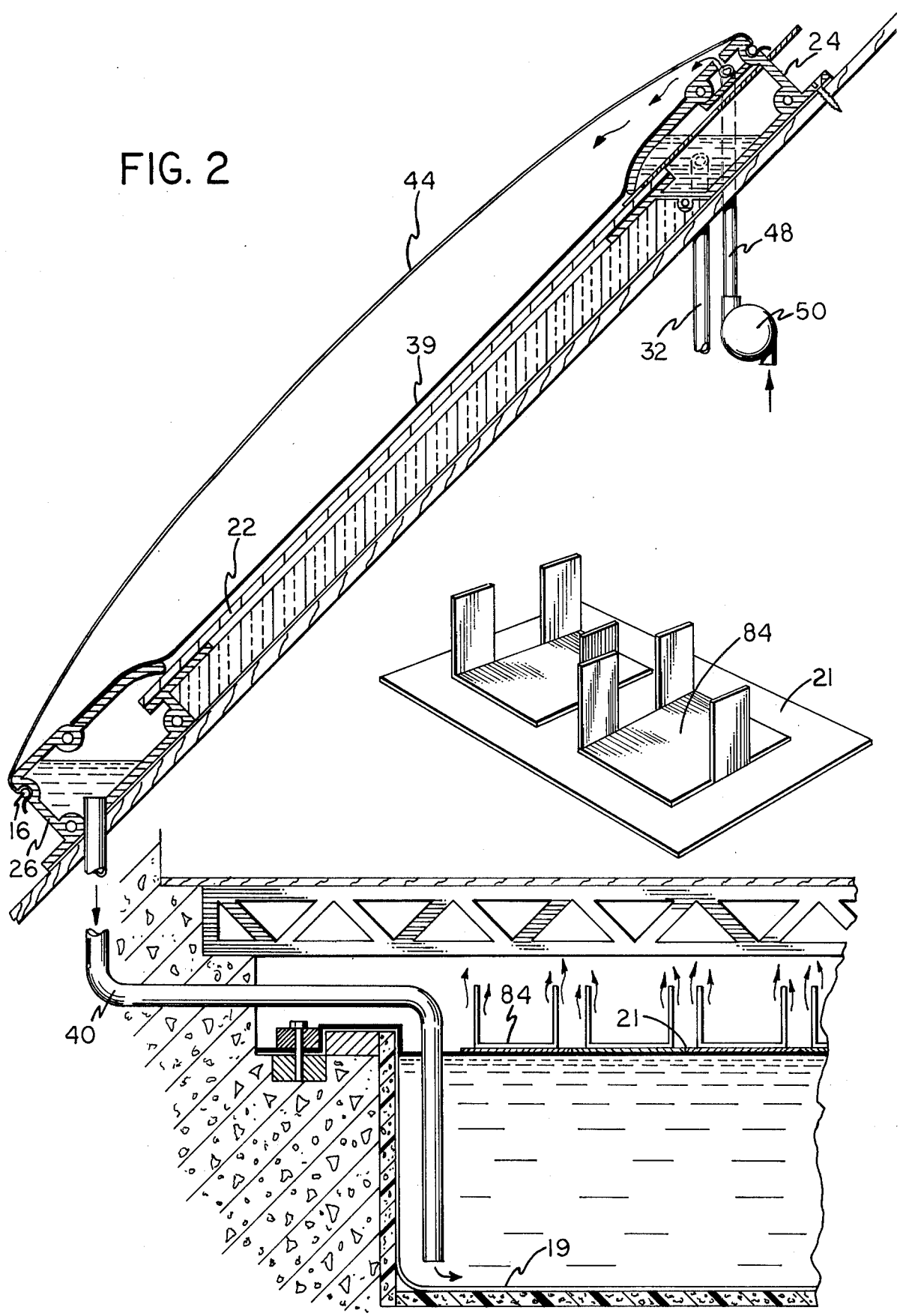
FIG. 2 is an enlarged detail view of a pertion of the structure shown in FIG. 1.
Figure 6:
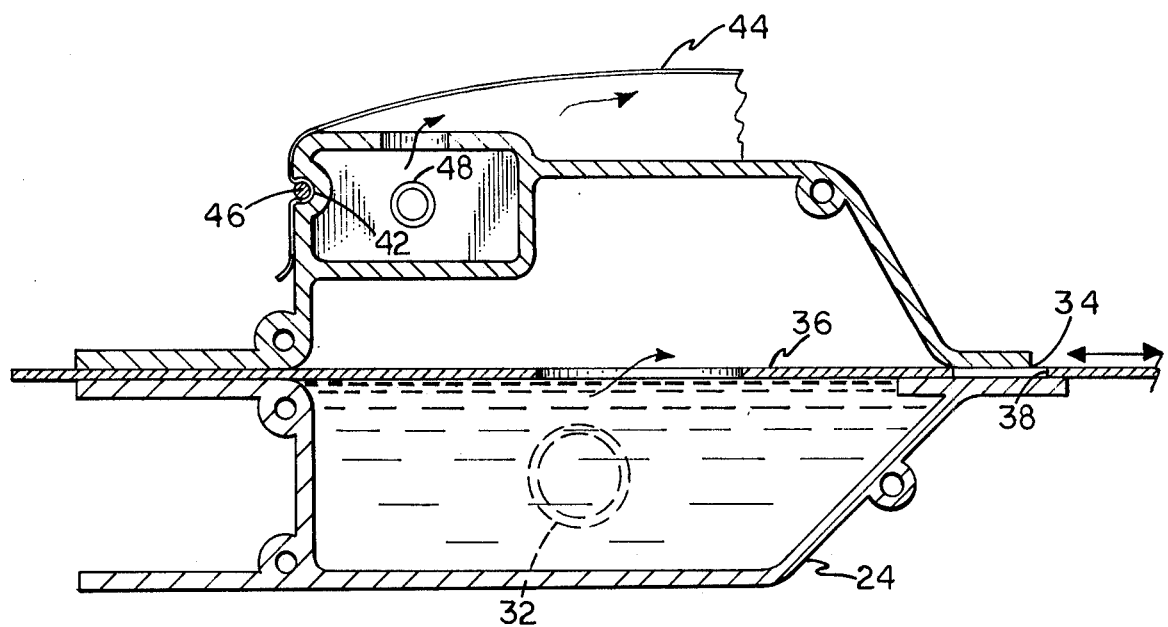
FIG. 6 below is a vertical cross sectional view of the upper member of the solar heat collecting unit.

Referring now to the drawings, a building is provided with a roof 10, vertical walls 12, interior rooms 14 and a bottom floor 16. Disposed below removable floor 16 is a hollow water proof chamber 18 partially filled with water to level 20. The chamber is lined with plastic as shown at 19. A plastic cover, thin and flexible, rests on the top surface of the water as shown at 21. The protion of the chamber above cover 21 contains air.

A solar heat collecting unit is disposed on the roof. It includes a flat inclined plate 22 typically of thin anodized aluminum foil, painted black and having a roughened or embossed surface supported by heat insulating, rigid substrate. (Of course other good conductors of heat such as copper or other metals as well as high temperature resistant plastic film can also be used). An upper member 24, a lower member 26 and opposite side members 28 define a supporting rectangular frame for the plate. These members can be formed for example of extruded aluminum. The upper member 24 is hollow and water from the chamber is fed upward via an electrically operated pump 30 and a vertical feed pipe 32 into the interior of the member 24. Member 24 has an elongated horizontal opening 34 through which the water flows downwardly along the surface of the plate 22 and is collected into member 26 which defines a collector gutter. Plate 36, disposed in opening 34 is slidable back and forth in member 24 by manual action (this action can be automatically controlled if desired). Plate 36 contains a plurality of triangularly shaped slots 38. The water discharged through opening 34 must first pass through those portions of slots 38 which are made accessible to the flows of water before flowing downward along plate 22. As the plate 36 is moved the area of those portions can be increased between positions of zero area in which water flow is blocked to intermediate positions in which the rate of flow gradually increased to a maximum position in which the entire area of slots 38 passes water and the rate of flow is maximum. This adjustment controls the amount of water exposed and thus regulates the temperature of the water heated by solar energy while flowing along plate 22. The roughened or embossed surface of the plate effectively lengthens the path of flow, increasing the period in which heat is transferred to the water so flowing and hence increasing the amount of heat transferred. The plate 22 is painted black to increase the heat collection efficiency of the solar heating unit. A strip of porous material such as felt or open cell foam can be disposed below the slots 38 to distribute the released water more evenly over the entire width of the unit. The water collected in member 26 flows downward through vertical drain pipe 40 back into the chamber 18. The water in the chamber is heated by solar energy this manner.

A transparent thin flexible plastic sheet 39 is secured peripherally to the supporting frame and is parallel to and spaced closely above plate 22. This will prevent condensation under the outer cover 44 (this cover is discussed in more detail below) and will minimize loss of collected heat.

The outside surfaces of member 24, 26 and 28 have an aligned horizontally elongated peripheral groove 42. The sheet 39 is covered by a flexible transparent inflatable cover 44 held in place by a rope 46 or other means disposed removably in groove 42. An electrically operated pump 50 pumps air in the enclosed space between cover 44 and sheet 39 via feed tube 48 to inflate the cover which then protects the plate 22 from external weather conditions. The cover can be replaced as required. The pump has a pressure control which is preset to maintain the pressure within the enclosed space at a small preselected positive pressure relative to atmospheric, thus maintaining the condition of inflation desired. The control cuts the pump off as often as necessary to prevent over inflation.

In some geographic areas, two weather cover sheets may be used disposed one above the other, being separated by air under small positive pressure as shown in FIG. 4. These sheets may be attached to each other as shown at 43 and 45 in regular intervals by a heat sealing process forming multiple adjacent domes connected to each other by partitions 49 having small interconnecting air passage 51 and inflated by the same source of air under pressure that is controlled and maintained from outside.

The interiors of the rooms 14 contain supply air ports 74 and return air ports 76. Fans 78 pull air from the chamber and feed same under pressure through supply ducts 80 to ports 74. Return air flows back through ports 76 and return ducts 82 to the chamber. When the air in the chamber is heated, it is apparent that the air discharged into the rooms will heat same in the manner of conventional forced air heating system.

In order to heat the air it is necessary to transfer heat from the heated water in the chamber to the air in the chamber. This is accomplished in the present embodiment by using a heat exchanger in the form of metal members 84 formed of anodized aluminum or other good heat conductor. These members have flat horizontal bottom surfaces which rest on the plastic cover 21 and receive heat from the water. The air used in heating is forced to flow over the top horizontal portion and the vertical exposed surfaces of members 84 which are disposed above the water level. Heat is thus transferred from the water to the members 84 and then from the member 84 to the air. Some electrically operated air blowers may be necessary in the air chamber to facilitate the heat transfer from water to air.

Thermostats, motorized dampers and other known control elements can be used to regulate the heat transferred to the rooms as desired for the desired heating action. For periods when sufficient solar heat is not available, auxiliary heating means must be used such as electric heat radiating ceiling panels or baseboard or the like to supplement the needed difference.

The arrangement of two spaced cover sheets shown in FIG. 4 can be modified to form a rectangular array of domes 47 inflatable via inlet valve 53 as shown in FIG. 5. This array can be used as insulation for windows or the like as well as being employed in the manner described with respect to FIG. 4.

What is claimed is:

1. A solar heating system for a building having an inclined roof, side walls and a removable sectional bottom floor, said system comprising:

a closed hollow water proof chamber disposed below said bottom floor, said chamber being partially filled with water and containing air;

a solar heat collector disposed in the roof, said collector having upper and lower spaced horizontal hollow members and a flat collector sheet having a roughened black top surface inclinedly disposed therebetween, the upper member having a water inlet and an elongated horizontal opening, the horizontal opening extending along the length of the upper member adjacent the sheet, said lower member having a water outlet and an elongated horizontal slot, said slot extending along the length of the lower member adjacent said sheet;

first means interconnecting said chamber and said water inlet to pump water from said chamber to said inlet, said water flowing out of said horizontal opening over said sheet for collection in said lower member, the water being heated by solar action as it flows over said sheet;

second means interconnecting said water outlet to said chamber to drain said heated water into said chamber;

a slidable perforated plate extending through said upper member and said opening, said plate being slidable to any position between fully closed and fully open to regulate the flow of water through said opening accordingly, and thus regulate the temperature of the water heated by flow along said plate;

a flexible transparent plastic cover;

third means detachably securing said cover to said upper and lower members, said cover extending over said sheet to protect same for external weather conditions; and fourth means to introduce air under pressure between said cover and said sheet to inflate said cover.

2. The system of claim 1 wherein each end of the upper member is secured to a corresponding end of the lower member by a corresponding one of two parallel end members whereby said upper member, lower member and end members form a frame, said third means including grooves in the outer peripheral surfaces of all of said members, said cover having portions fitting removably in said grooves, said third means further including a cord removably disposed in said grooves and overlying said cover portions.

3. The system of claim 2 further including a transparent thin plastic sheet secured peripherally to all of said members, said plastic sheet being disposed parallel to and spaced closely above the collector sheet within the inflated cover, said plastic sheet preventing condensation under said cover.

4. The system of claim 1 further including a second cover in said chamber resting upon the top surface of the water therein; and a plurality of heat exchangers which are good thermal conductors, said exchangers having flat horizontal portions resting upon said film and spaced vertical portions which extend upward from the horizontal portions whereby heat from the water is transferred to the air surrounding said vertical portions of said exchangers and said air is heated.

5. The system of claim 4 further including fourth means to circulate said air around said exchangers, fifth means to distribute said heated air to the interior of said building.

* * * * *